United States Patent [19]
Obata et al.

[11] Patent Number: 5,528,699
[45] Date of Patent: Jun. 18, 1996

[54] INFORMATION MEDIUM RECOGNITION DEVICE

[75] Inventors: Kenzo Obata, Okazaki; Yoshiki Uchikawa, Nagoya; Takeshi Furuhashi, Nagoya; Shigeru Watanabe, Nagoya, all of Japan

[73] Assignee: Nippondenso Co., Ltd., Kariya, Japan

[21] Appl. No.: 311,013

[22] Filed: Sep. 23, 1994

Related U.S. Application Data

[63] Continuation-in-part of Ser. No. 65,800, May 24, 1993, abandoned.

[30] Foreign Application Priority Data

Nov. 24, 1992 [JP] Japan ..................... 4-313605

[51] Int. Cl.$^6$ ................................................. G06K 9/00
[52] U.S. Cl. ..................... 382/121; 382/159; 382/187
[58] Field of Search ..................... 282/119, 121, 282/155, 156, 159, 187, 186, 280; 395/3, 65; 1789/18–20

[56] References Cited

U.S. PATENT DOCUMENTS

| | | | |
|---|---|---|---|
| 5,050,219 | 9/1991 | Maury | 382/3 |
| 5,109,426 | 4/1992 | Parks | 382/3 |
| 5,165,102 | 11/1992 | Sawyer | 382/13 |
| 5,239,593 | 8/1993 | Wittner et al. | 382/14 |

FOREIGN PATENT DOCUMENTS 432431   5/1992   Japan .

OTHER PUBLICATIONS

"A Basic Study on Signature Recognition" by S. Watanabe et al; The 8th Fuzzy System Symposium Lecture Theses; May, 1992; pp., 173–176 (with complete English translation).

"A New Fourier Descriptor Applicable to Open Curves" by Y. Uesaka; Journal of Society of Electronic Communication, '84/3, vol. U67–A, No. 3, Mar., 1984; pp. 166–172 (with partial English translation).

*Primary Examiner*—Joseph Mancuso
*Attorney, Agent, or Firm*—Cushman, Darby & Cushman

[57] ABSTRACT

An information medium recognition device for recognizing an information medium such as a handwritten signature inputted by performing an online input operation. The information medium recognition device is provided with an input portion for inputting the information medium (e.g., a signature) online and outputting an information signal representing the inputted information medium, a detection portion for detecting spectral intensity of the signature by performing a P-type Fourier transform processing on the information signal received from the input portion, an input fuzzy portion for converting the spectral intensity into a compressed fuzzy cardinality or density by performing a fuzzy inference process on the spectral intensity, which is detected by the detection portion, a conversion portion that converts the spectral intensities into fuzzy sets by performing a fuzzy inference process and a fuzzy net portion and an output fuzzy portion for judging from the fuzzy density obtained from the output of the fuzzy net portion whether or not the information medium is genuine. Thereby, the genuineness of an information medium (e.g., a handwritten signature) can be accurately recognized and judged on the basis of data obtained as the result of the fuzzy inference processing performed by the input fuzzy portion and the fuzzy net portion.

8 Claims, 12 Drawing Sheets

FIG. 3(a)
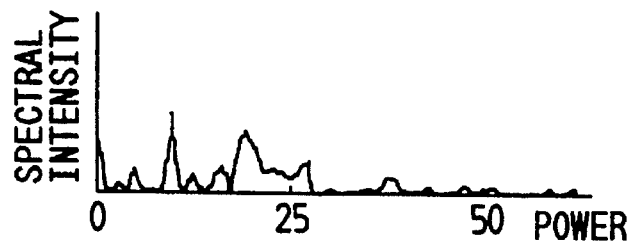
FIG. 3(b)
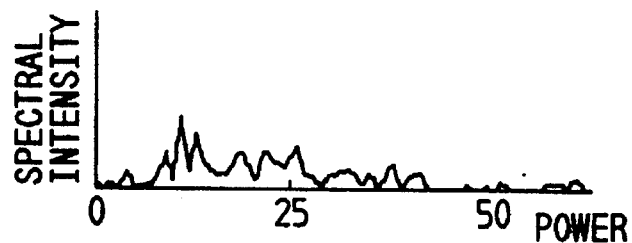
FIG. 3(c)
FIG. 4
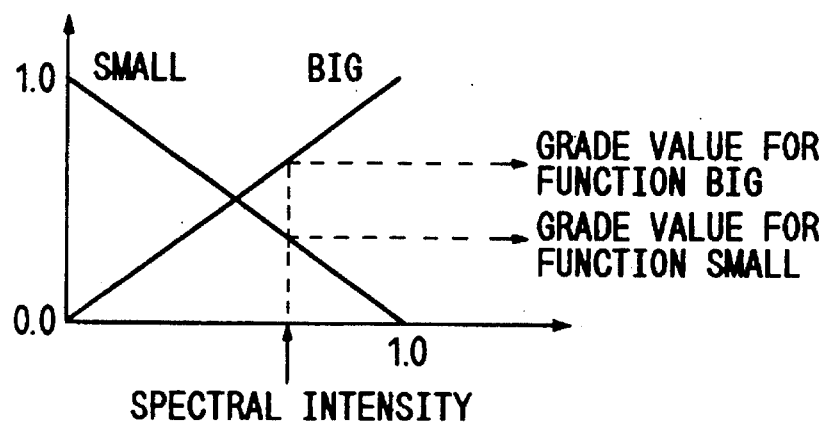

$$O = \frac{1}{1+\exp^{-s}}$$

COSINE WAVE COMPONENT

SINE WAVE COMPONENT

FIG. 8(c)

INFORMATION MEDIUM RECOGNITION DEVICE

This is a continuation-in-part of application Ser. No. 08/065,800, filed on May 24, 1993, which was abandoned upon the filing hereof.

BACKGROUND OF THE INVENTION

1. Field of the Invention

This invention generally relates to an information medium recognition device and more particularly to a device for recognizing an information medium such as a signature handwritten by a signer, which is inputted by performing what is called an online input operation by using a writing means connected to a terminal or the like.

2. Description of the Related Art

A conventional character recognition device for recognizing a character inputted by what is called an on-line input operation by using a writing means (e.g., a pen) connected to a terminal or the like has a configuration illustrated in FIG. 9.

Namely, in the online input type handwritten character recognition device 1 of FIG. 9, inputting data representing a handwritten character is performed online using a handwriting input portion 4 consisting of a pen (or penlike stylus) 2 and a graphics tablet (hereunder referred to simply as a tablet) 3 and the inputted data is then recognized. A practical operation will be described as follows. First, a writer or operator handwrites a character on the tablet 3 with the pen 2. Generally, there are frames 11 indicating the size of a character to be inputted and the position, at which the character should be inputted, on an input surface of the tablet 3. Thus, the writer should write a character within the frame 11.

When the writer handwrites a character on the tablet 3, continuous coordinate data representing continuous coordinates of a locus of the pen 2 and data indicating whether or not any character is written (namely, what is called pen touch information), which are obtained by utilizing the electromagnetic coupling between the pen 2 and the tablet 3, are outputted from the tablet 3. Then these data are inputted to a feature extraction portion 6 of the character recognition device 1 in which it is judged where the end of the continuous coordinate data corresponding to each character is.

When the continuous coordinate data corresponding to each character is discriminated by the feature extraction portion 6, character stroke coordinate sequence data stored in a dictionary portion 10 are compared with the continuous coordinate data, successively, in a comparison portion 7 of the character recognition device 1 provided in a recognition portion 9. This character stroke coordinate sequence data are data indicating, for instance, the relative position of each stroke, the order in which strokes composing each character is generated and the length and direction of each stroke (namely, each stroke vector).

Each inputted character is handwritten. Therefore, in this comparison processing effected in the comparison portion 9, there are few cases in which the continuous coordinate data corresponding to such a handwritten character is matched with the character stroke coordinate sequence data. Thus, the comparison portion 9 outputs character stroke coordinate sequence data having a smallest relative error (namely, a smallest difference from the continuous coordinate data to be compared therewith) as data representing a first candidate character. Thereafter, the portion 9 outputs character stroke coordinate sequence data representing a second candidate character, and stroke coordinate sequence data representing a third candidate character, serially.

When the recognition portion 7 thus outputs results of the recognition of each inputted character sequentially, an output portion 8 displays each of the results of the recognition. Then, the writer or operator selects one of the displayed first, second and third candidate characters as the character inputted by the handwriting input portion 4.

However, in a conventional character recognition device, objects to be recognized are characters which can be registered by what are called printing types. In contrast, in cases of handwritten characters such as signatures, there are differences in shape of each character among signers. Moreover, there are subtle differences among signatures written by a same person. Thus, character stroke coordinate sequence data corresponding to each of such characters cannot be uniquely set. Consequently, the conventional character recognition device has a drawback in that it is difficult to recognize handwritten characters.

Furthermore, in the conventional online input type character recognition device, as a result of being provided with the tablet 3, the size of each input character and the range in which each input character is written, are limited. Moreover, there are errors (or changes) in continuous coordinate data due to difference in a writing speed. Consequently, the online input type character recognition device has a drawback in that it is difficult to recognize characters such signatures, which are not registered as printing types and are generally written continuously. The present invention is accomplished to eliminate the above described drawbacks of the conventional device.

It is, accordingly, an object of the present invention to provide an information medium recognition device which can recognize an information medium such as a handwritten signature inputted by effecting what is called an online input operation.

SUMMARY OF THE INVENTION

To achieve the foregoing object, in accordance with the present invention, there is provided an information medium recognition device for recognizing an information medium such as a handwritten signature inputted by performing an offline input operation, which comprises input means for inputting the information medium (e.g., a signature) online and outputting an information signal representing the inputted information medium, detection means for detecting spectral intensity of the signature by performing a P-type Fourier transform processing on the information signal received from the input means, input fuzzy means for converting the spectral intensity into a compressed fuzzy cardinality (in the instant application, referred to as a fuzzy density) by performing a fuzzy inference process on the spectral intensity, which is detected by the detection means, a conversion means for converting the spectral intensities of the signature into fuzzy sets based on membership functions by performing a fuzzy inference process, and fuzzy net means for judging from the fuzzy density obtained by the input fuzzy means whether or not the information medium is genuine.

Thus, the fuzzy input means converts the spectral intensity into the compressed fuzzy density by performing a fuzzy inference process on the spectral intensity detected by the detection means. Then, fuzzy net means judges on the basis of the fuzzy density whether or not the information medium is genuine.

As the result, the number of data representing the spectral intensity can be decreased to that of fuzzy rules employed for effecting the fuzzy inference. Consequently, a vast amount of data representing the stroke densities can be compressed. Moreover, change of the data representing an information medium due to a distortion caused in generating the information medium (e.g., in writing a signature) can be absorbed into the data representing the fuzzy density as the result of this fuzzy inference operation.

Thereby, the device has an excellent effect in that the genuineness of an information medium (e.g., a handwritten signature) can be accurately recognized and judged on the basis of data obtained as the result of the fuzzy fuzzy input processing performed by the inference means in spite of the fact that the information medium (e.g., the shape of a character of the signature) delicately varies with users (e.g., signers) and that each time a user generates an information medium (e.g., each time a signer writes his signature), the information medium (e.g., the shape of a character of the signature of the same signer) changes delicately.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIGS. 3(a), 3(b) and 3(c) are diagrams for illustrating an example of power spectra outputted from a P-type Fourier transform portion of FIG. 1;

FIG. 4 is a graph for illustrating a membership function employed by the fuzzy net portion;

FIGS. 8(a) to 8(c) are diagrams for illustrating a calculation process of calculating the spectral intensity from connection weight coefficients, which is performed by defuzzification portions of FIG. 1;

FIG. 18 is a flowchart for illustrating an operation of calculating a spectral intensity, which is performed the defuzzification portion;

FIG. 16(a) is a graph illustrating membership functions employed in an output fuzzy portion;

FIG. 16(b) is a diagram illustrating a genuineness judgement map stored in the output fuzzy portion; and FIG. 17 is a block diagram illustrating the detail configuration of the output fuzzy portion.

DETAILED DESCRIPTION OF THE PREFERRED EMBODIMENTS

Hereinafter, the preferred embodiments of the present invention will be described in detail by referring to the accompanying drawings.

Figure 1:
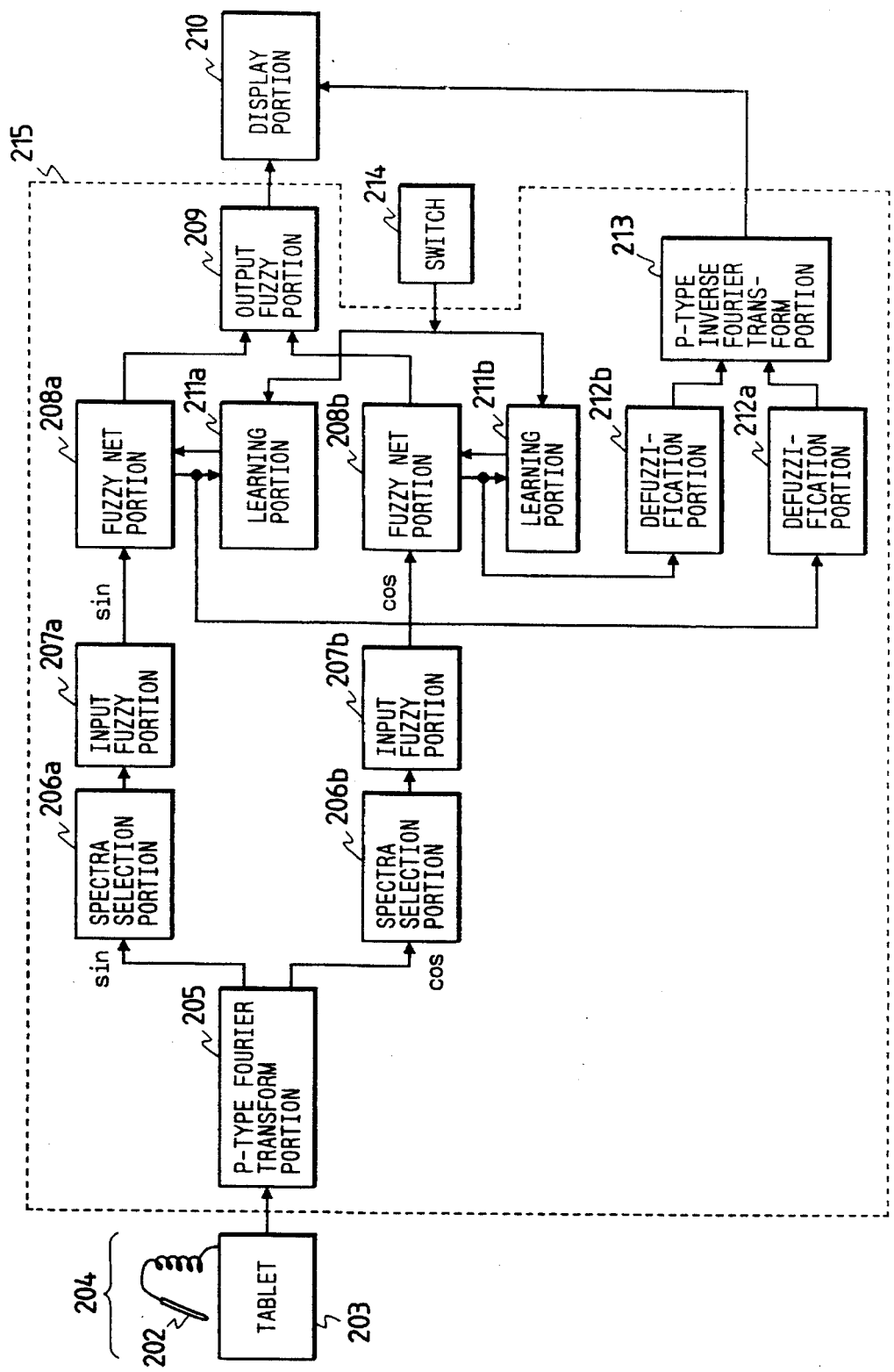
FIG. 1 is a schematic block diagram for illustrating the configuration of an embodiment of the present invention.

FIG. 1 is a schematic block diagram for illustrating the configuration of an embodiment (hereunder sometimes referred to as a first embodiment) of the present invention.

In the device of FIG. 1, a handwriting input portion 204 (corresponding to the input means) having a pen 202 and a tablet 203 detects (namely, obtains) continuous coordinate data representing a locus of the pen 2 and data indicating whether or not any character is written (namely, what is called pen touch information) by utilizing the electromagnetic coupling between the pen 202 and the tablet 203. Then, the portion 204 outputs the detected data as signature data. Incidentally, instead of such a type of portion 204, another type of a handwriting input portion 204 for inputting a handwritten signature by detecting the pressure put by the pen 202 on the tablet 203 may be employed.

Further, a P-type Fourier transform portion 205 (corresponding to the above described detection means) performs a discrete Fourier transform (DFT) of a complex-valued function $\omega$ called as a P-type Fourier descriptor (hereunder sometimes referred to simply as a P-type descriptor) c for a continuous curve C on a plane (hereunder sometimes referred to as a plane continuous curve C), which is given by the following equation (2), by using another complex-valued function $\omega$ called as P-representation for the plane continuous curve C, which is given by the following equation (1).

$$\omega(j)=\exp(i\ \theta(j)) \qquad (1)$$

where $\theta(0)=a(0)$, $\theta(j)=\theta(j-1)+a(j)$ and $j=0, 1, 2, \ldots, n-1$.

$$c(\kappa)=(1/n)\ \Sigma\omega(j)\exp[(-2\pi i)(j\ \kappa/n)] \qquad (2)$$

where $\kappa=0, 1, 2, \ldots, n-1$.

Incidentally, in the equation (1), $a(j)$ is an argument function representing an argument at a point $z(j)$ on the continuous curve C, and $\theta(j)$ is a total curvature function at the point $z(j)$. Further, the following equation (3) of $\omega(j)$ is obtained by solving the equation (1) for the function $\omega(j)$ and using the equation (2).

$$\omega(j)=\Sigma c(\kappa)\exp[(-2\pi i)(j\kappa/n)] \qquad (3)$$

As is seen from the equation (3), the P-type descriptor c and the complex-valued function $\omega$ have a one-to-one correspondence. Thus, the plane continuous curve C and the P-type descriptor C also has a one-to-one correspondence. Therefore, the P-type Fourier descriptor c extracts features of bends of a line graphic form well. Further, the P-type Fourier descriptor c is invariant when a parallel displacement, an expansion and a reduction of a graphic form occur. Incidentally, the P-type descriptor is described in detail in an article entitled "A New Fourier Descriptor Applicable To Open Curves" (in Japanese) by Y. Uesake, Denshi-Tsushin-Gakkai Ronbunshi, '84/3 Vol. J67-A No. 3, pp. 166–173. Therefore, the detailed description of the P-type Fourier descriptor is omitted herein for brevity of description.

Further, the P-type Fourier transform portion 205 performs the above described Fourier transform on the signature data outputted from the handwriting input portion 204 and then outputs the power spectra of the cosine wave component of FIG. 3(b) and that of the sine wave component of FIG. 3(c). Incidentally, the graphs of FIGS. 3(b) and 3(c) show the power spectra of the cosine wave component and that of the sine wave component obtained when the signature "Watanabe" is inputted from the handwriting input portion 4. Thereafter, the power spectra of the cosine wave component and that of the sine wave component are processed by different processing systems, respectively.

A spectra selection portion 206a extracts only necessary power spectra therefrom by eliminating unnecessary spectra from the power spectra of the sine wave component outputted from the P-type Fourier transform portion 205. In this embodiment, high-frequency components of the power spectra corresponding to the powers higher than 64th power are eliminated. The purpose of this is as follows. Namely, the spectral intensity of the power spectra corresponding to the power higher than 64th power is very small. Thus, the operational burden (to be described later) is lessened by eliminating the power spectra corresponding to the power higher than 64th power.

Similarly, a spectra selection portion 206b extracts only necessary power spectra therefrom by eliminating unnecessary spectra from the power spectra of the cosine wave component outputted from the P-type Fourier transform portion 205.

Further, fuzzy portions 207a and 207b (corresponding to the above-mentioned inference means according to the present invention) are provided correspondingly to each scanning line used by the memory scan portion 203 and employs a triangle type (namely, Λ-type) membership function as an internal function and converts the spectral intensity corresponding to each of the sine and cosine wave components into a fuzzy density. Thus, the data representing the selected power spectra is compressed. Incidentally, a fuzzy rule corresponds to a triangle-type membership function. Further, each input fuzzy portion has an output signal correspondingly to a fuzzy rule. Thus, the number of data representing the power spectra is reduced to the number of the provided membership functions.

Figure 5:
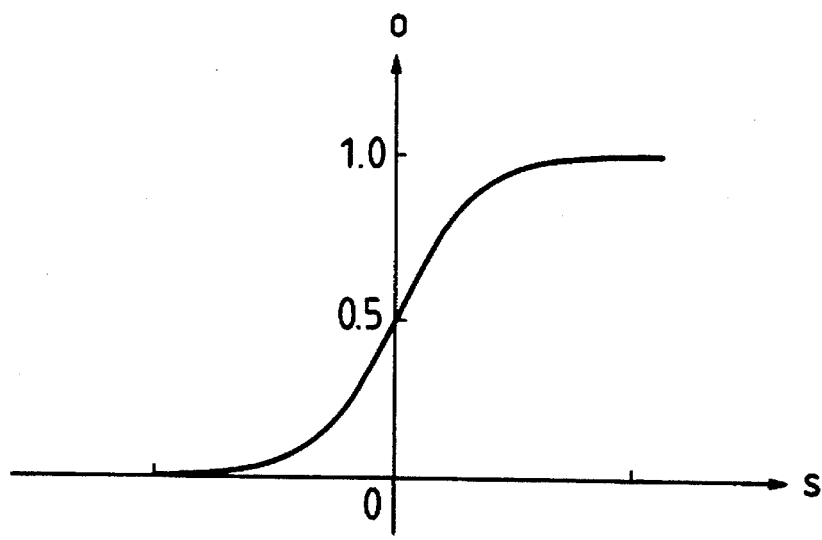
FIG. 5 is a graph for illustrating the characteristic of a sigmoid function O employed by the fuzzy net portion.

Further, each of the fuzzy net portions 208a and 208b employs membership functions of two kinds (namely, Small and Big kinds) illustrated in FIG. 4 and a sigmoid function O indicating characteristics illustrated in FIG. 5 as internal functions. Moreover, each of the portions 208a and 208b performs a fuzzy inference process on the fuzzy density corresponding to each of the sine and cosine wave components, which is obtained by the input fuzzy portions 207a and 207b as the result of the conversion, and outputs data representing certainty of the signature data inputted online. Incidentally, two kinds of the membership functions are used for extracting intervals between lines, which are features of each signature. Additionally, the membership functions are used for linearization of data represented by input signals of the fuzzy net portions 208a and 208b to ensure convergence of connection weight coefficients.

Furthermore, each of learning portions 211a and 211b operates during the fuzzy net portion effects a learning operation. Namely, each of the learning portions 211a and 211b establishes connection weight coefficients α to be used in a corresponding one of the fuzzy net portions 208a and 208b and works until the coefficients α converge on some values. Incidentally, output signals of each of the learning portion 211a and 211b are fed back to the corresponding one of the fuzzy net portions 208a and 208b as signals representing the connection weight coefficients α.

Figure 8A:
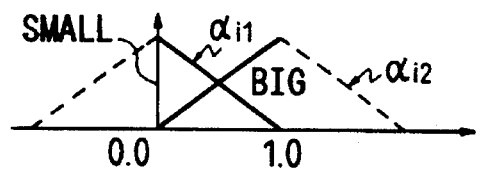

Additionally, defuzzification portions 212a and 212b are used to obtain the barycenter or centroid c(i) (namely, the spectral intensity) of each membership function as the intensity corresponding to an ith frequency component. Namely, the values or levels of the power spectra in the vicinity of each of the values of 0.0 and 1.0 cannot be reproduced by using the membership functions employed in the input fuzzy net portions 207a ad 207b if these functions are unchanged. Thus, triangle type membership functions obtained by adding portions indicated by dashed lines in FIG. 8(a) are generated. Further, the barycenter c(i) of the membership functions multiplied by the connection weight coefficients is calculated correspondingly to each parameter (n to m) of the fuzzy density.

Here, the barycenter c(i) is given by the following equation (4).

$$c(i)=\alpha_{i2}/(\alpha_{i1}+\alpha_{i2}) \qquad (4)$$

where $\alpha_{i1}$ and $\alpha_{i2}$ designate the connection weight coefficients corresponding to ith power.

Then, data representing the obtained barycenter c(i) of the membership functions is inputted to a P-type inverse Fourier transform portion 213.

The P-type inverse Fourier transform portion 213 performs an inverse Fourier transform corresponding to the Fourier transform performed by the P-type Fourier transform portion 205 and has characters due to the P-type descriptor similarly as the portion 205. Subsequently, data indicating a result of the inverse Fourier transform performed by the portion 213 is inputted to a display portion 210 whereby a reproduction curve is displayed as illustrated in FIG. 8(c).

Further, the output fuzzy portion 209 (corresponding to judgement means according to the present invention) has a configuration similar to that of each of the input fuzzy portions 207a and 207b. Moreover, each of the output fuzzy portion 209 judges whether the signature represented by the signature data inputted from the handwriting input portion 204 is genuine or false, by applying the fuzzy inference technique employed therein on a result of the inference (namely, the certainty calculated from a sigmoid function (to be described later)) outputted from the corresponding one of the fuzzy net portions 208a and 208b.

This output fuzzy portion 209 receives two input data (namely, data representing the certainty connected with the power spectra (or spectral intensities) of the sine wave component, which data is output from the fuzzy net portion 208a, and data representing the certainty connected with the power spectra (or special intensities) of the cosine wave component, which is outputted from the fuzzy net portion 208b) and issues only one output correspondingly to the two data input thereto. At that time, the output fuzzy portion 209 does not simply calculate the logical product of the two data input thereto. Instead of this, the portion 209 makes a final judgement on whether the signature is genuine or false, by making much of a balance between the sine and cosine wave components or the correlation between outputs of the fuzzy net portions.

Namely, in a fuzzy inference portion 209a of the output fuzzy portion 209 of FIG. 17, a fuzzy inference is first performed on each of the outputs of the fuzzy net portions 208a and 208b by using five membership functions corresponding to five stages or fuzzy sets S (namely, "Middle"), MB (namely, "between Middle and Big") and B (namely, "Big"), respectively. Incidentally, in case of this embodiment, the same membership functions as these membership functions used for performing a fuzzy inference on the sine wave component are also used for performing a fuzzy inference on the cosine wave component. However, membership functions other than membership functions used for performing a fuzzy inference on the sine wave component may be used for performing a fuzzy inference on the cosine wave component. For example, in case of a handwritten signature which is apt to be elongated in the horizontal direction continuously, information corresponding to the horizontal direction is specially important. Therefore, membership functions with higher resolution (namely, membership functions corresponding to more than five fuzzy sets (in the instant application, such membership functions are referred to as high-resolution type membership functions)) may be employed as those used for performing a fuzzy inference on the cosine wave component.

Figure 6:
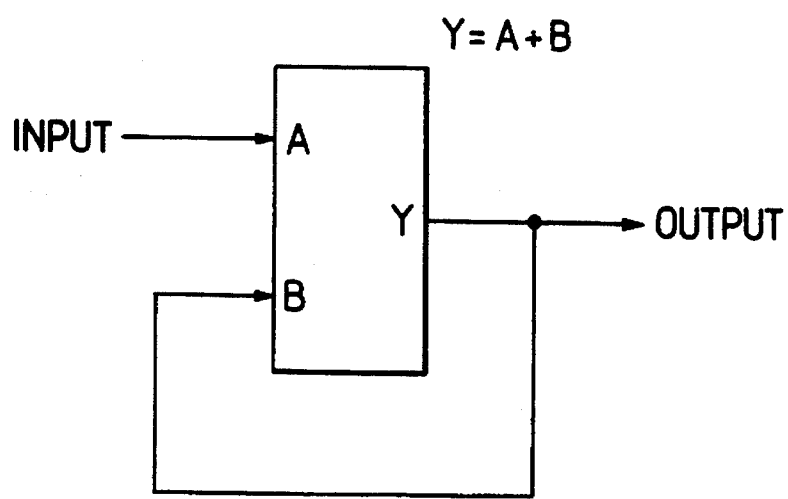
FIG. 6 is a circuit diagram for illustrating the practical configuration of an addition portion.

Subsequently, in a genuineness judgement portion 209b, it is judged from results of the inference performed on the sine wave component and the cosine wave component by using a map (or table) preset therein as illustrated in FIG. 6(b) whether or not the signature is genuine. Namely, each of the results of the inference performed on the sine wave component and that of the inference performed on the cosine wave component is represented by "S", "MS", "M", "MB", or "B" (for instance, it is assumed that the result of the inference performed on the sine wave component is "M" and that of the inference performed on the cosine wave component is "B"). Then, in the map of FIG. 16(b), a cell corresponding to the combination of these results (namely, "M" and "B") is referred to. As is seen from this map, "T" described in such a cell is a result of the judgement (namely, the signature is genuine). Incidentally, in FIG. 16(b), reference character T designates "true" (namely, "genuine"); F "false"; and NG "data invalid" (namely, data representing a result of the inference should be regarded as invalid).

Here, note that the distributions of "T", "F" and "NG" (namely, the balance between the sine wave component and the cosine wave component, which affects the genuineness judgement) in this map are preliminarily determined according to the purpose of using this recognition device. For example, in case where this recognition device is used in a security system, each "NG" of FIG. 116(b) is replaced with "F". Thus, in such a case, only when the result corresponding to one of the sine and cosine wave components is more than "MS" (namely, is one of "M", "MB" or "B") and that corresponding to the other component is more than "M" (namely, the signature is genuine). Thereby, the security can be assured more surely, In contrast, in case where this recognition device is used merely for personal recognition which does not require high security, each "NG" of FIG. 16(b) may be replaced with "T". Further, in such a case, it is predetermined that only when both of the results, respectively, corresponding to the sine and cosine wave components are more than "MS" (namely, is one of "M", "MB" or "B"), the result of the judgement is "T". Thus, a criterion for judging the signature to be genuine is lowered. In other cases, for example, the number of cells corresponding to "NG" of FIG. 6(b) may be changed.

Thus, the outputs of the fuzzy net portions 208a and 208b (namely, the sine wave component and the cosine wave component) can be converted by performing the fuzzy inference thereon into highly flexible data (namely, the fuzzy sets S, MS, MB and B). Thereby, the judgement on the genuineness of the signature can be easily performed by simply referring to the predetermined map, a cell of which corresponds to the combination of the fuzzy sets representing the results of the fuzzy inference on the outputs of the fuzzy net portions and indicates a result of the judgment.

Moreover, a result of recognition, which would be obtained by taking a balance between the sine and cosine wave components into consideration, instead of simply calculating the logical product, can be obtained by changing the distributions of "T", "F" and "NG" in the map according to the purpose of using the recognition device.

Incidentally, in addition to the above described reason, another reason why the fuzzy inference technique is applied to the judgement on whether or not the signature is false is as follows. In case where a threshold or reference value is employed as a criterion of such a judgement (for instance, if the criterion is equal to or more than 0.9, the signature is genuine, but if equal to or less than 0.1, the signature is false), if an output of the fuzzy net portion is 0.3 or 0.89, the device may make an error in judgement due to a small difference in numerical value from the threshold. Namely, in case of applying a conventional threshold method to the judgement, there may occur a few errors in judgement. Therefore, for the purpose of preventing an occurrence of such an error in judgement, the fuzzy inference technique is applied to the judgement on whether or not the signature represented by the signature data is false.

Further, a dot matrix liquid crystal display or a cathode ray tube (CRT) may be employed as the display portion 210. In case of this embodiment, the display portion 210 displays a result of the judgement on whether or not the signature represented by the signature data is false. Moreover, the portion 210 displays a reproduction curve as representing the signature inputted online and reproduced as the result of the operations of the defuzzification portions 212a and 212b and the P-type inverse Fourier transform portion 213.

In addition, when the fuzzy net portions 208a and 208b are in a learning mode, an operator or signer judges whether or not the judgement made by the output fuzzy portion 209 is correct. Then, the operator manipulates a switch 214 to give his judgement to the learning portions 211a and 211b. Thereby, the degree of change in value of the connection weight coefficients α set in the learning portions 211a and 211b is determined.

Incidentally, the P-type Fourier transform portion 205, the spectra selection portions 206a and 206b, the input fuzzy portions 207a and 207b, the fuzzy net portions 208a and 208b, the learning portions 211a and 211b, the output fuzzy portion 209, the P-type inverse Fourier transform portion 213 and the defuzzification portions 212a and 212b are implemented according to programs to be executed in a central processing unit (CPU) 215.

Next, an operation of the entire device having the above described configuration will be described hereinbelow.

In case of the device of FIG. 1, when a signature is handwritten on the tablet 203 by using the pen 202, data representing the locus of the pen 202 (namely, the stroke coordinate sequence) is outputted as X-Y data from the tablet 203. Moreover, what is called pen touch information is also outputted as Z data from the tablet 203. This pen touch information is information to be used to judge whether or not a signature can be inputted, as a result of detecting whether or not the pen 202 is in contact with the tablet 203.

Further, the handwriting input portion 204 always performs a sampling of input data. If a writing speed is high, a small amount of X-Y data is outputted. If the writing speed is low, a large amount of X-Y data is outputted. The X-Y data (representing stroke coordinate sequence) and the Z data (representing pen touch information) are inputted to the P-type Fourier transform portion 205. The processing to be performed after that is effected by the CPU 215.

Figure 11:
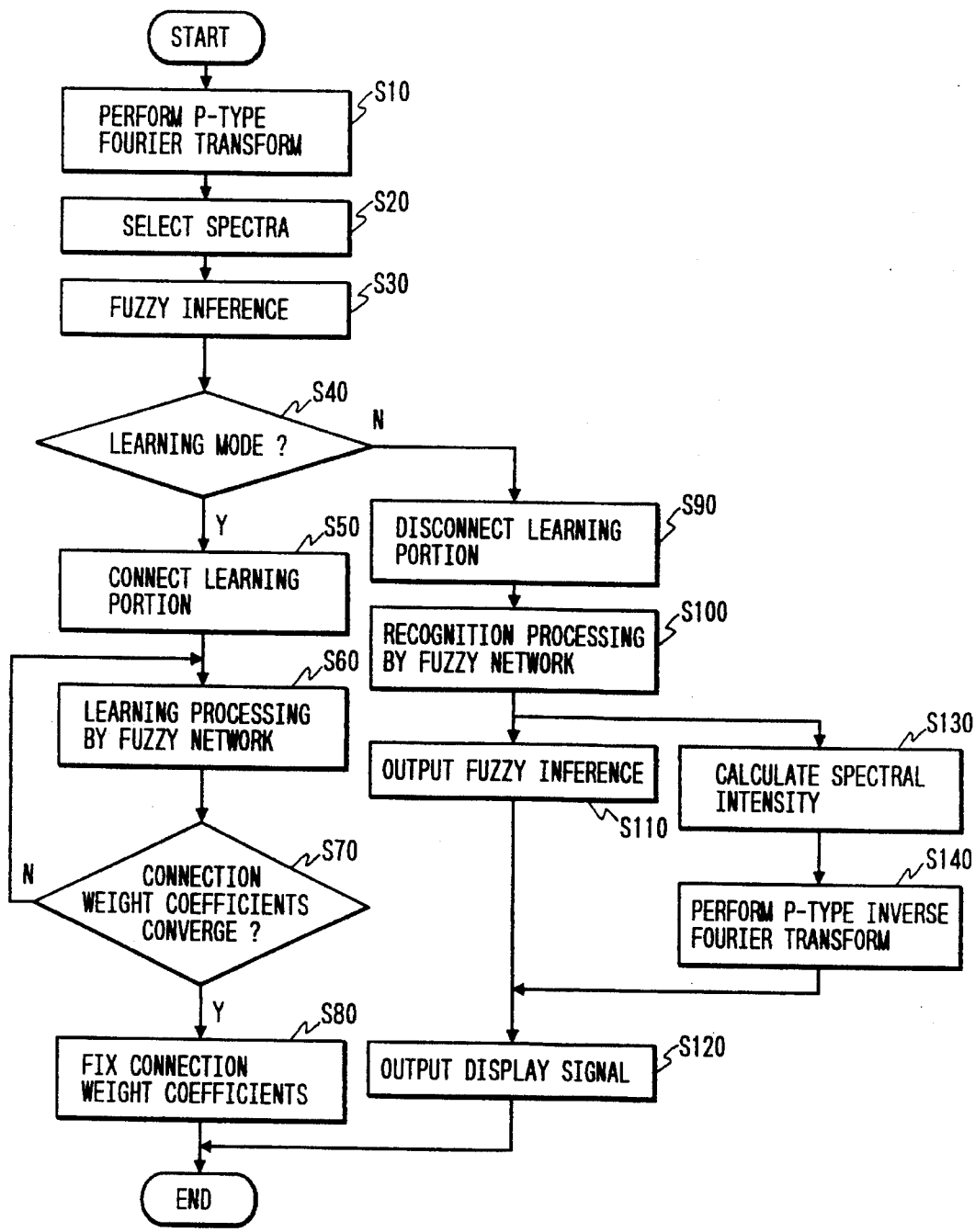
FIG. 11 is a flowchart for illustrating an operation of a CPU of FIG. 1.

As shown in a flowchart of FIG. 11 illustrating an operation of the CPU 215, the CPU 215 first performs the DFT of the complex-valued function expressed by the equation (1) and outputs the power spectra of the cosine wave component and that of the sine wave component in step S10. Subsequently, in step S20, unnecessary spectra, namely, high-frequency components of the power spectra corresponding to the powers higher than 64th power are eliminated from the power spectra of the sine and cosine wave components outputted from the P-type Fourier transform portion 205 and thus only necessary power spectra are extracted.

Then, in step S30, the spectral intensity of the power spectra extracted in step S20 is converted into the fuzzy density. Incidentally, this corresponds to the operations of the input fuzzy portions 207a and 207b of FIG. 1. The details thereof will be described later.

Subsequently, in step S40, it is judged from a signal sent from a selection portion (not shown) which of a recognition mode and a learning mode the mode of a current operation of the device is. In case of the recognition mode, the program goes forward to step S90. In case of the learning mode, the program advances to step S50.

If it is judged in step S40 that the device is in the learning mode, the learning portions 211a and 211b are connected with the fuzzy net portions 208a and 208b, respectively, in step S50. Subsequently, a learning control operation is effected by a neural network and an established value of each of the connection weight coefficients α is changed in step S40. This corresponds to operations of the fuzzy net portion 205 and the learning portion 206 and will be described in detail later.

Further, in step S70, it is judged whether or not the value of the connection weight coefficient α converges and is fixed at a predetermined value. If judged as not fixed, the processing of step S60 is performed again. If judged as converges and fixed at a predetermined value, the program goes forward to step S80.

In step S80, the fixed values of the connection weight coefficients α judged as converges thereon are stored in registers 313n to 313m (to be described later) and a sequence of the learning processing is terminated.

On the other hand, if it is judged in step S40 that the device is in the recognition mode, the learning portions 211a and 211b are disconnected from the fuzzy net portions 208a and 208b, respectively, in such a manner not to change the connection weight coefficients α. Incidentally, instead of this, a learning unit 307 may be disconnected from a register portion 313n. Alternatively, change in the connection weight coefficient αn used in the register 313n may be inhibited.

Subsequently, in step S100, a recognition processing is effected by a neural network and the certainty of the signature inputted by the handwriting input portion 204 is calculated. This corresponds to the operations of the fuzzy net portions 208a and 208b of FIG. 1 and will be described in detail later.

Next, in step S110, a fuzzy inference process is performed on the certainty of the inputted signature, which is calculated in step S100 and it is judged whether or not the inputted signature is false. Further, in step S120, a display signal representing the result of this judgement is outputted to the display portion 210 whereupon data representing that the inputted signature is genuine or false is displayed. Thus, the sequence of the recognition processing is finished.

On the other hand, in step S130 to be effected in parallel with step S110, the barycenter c(i) (namely, the spectral intensity) of the membership functions is calculated from the connection weight coefficients α as the intensity of an ith frequency component in order to display the reproduction curve as the signature, which is inputted by the handwriting input portion 204 and reproduced, on the display portion 210. This corresponds to the operations of the defuzzification portions 212a and 212b of FIG. 1 and will be described in detail later.

Further, in step S140, a P-type inverse Fourier transform is performed on the spectral intensity obtained in step S110. Furthermore, in step S120, a display signal indicating a result of this transform is outputted to the display portion 210. Then, the reproduction curve of the inputted signature as illustrated in FIG. 8(c) and the result of the judgement on the genuineness of the signature are displayed on the display portion 210. Thus, the sequence of the recognition is completed.

The operations of the entire device or embodiment have been described above. Hereinafter, the details of each operation of this embodiment will be described.

Figure 12:
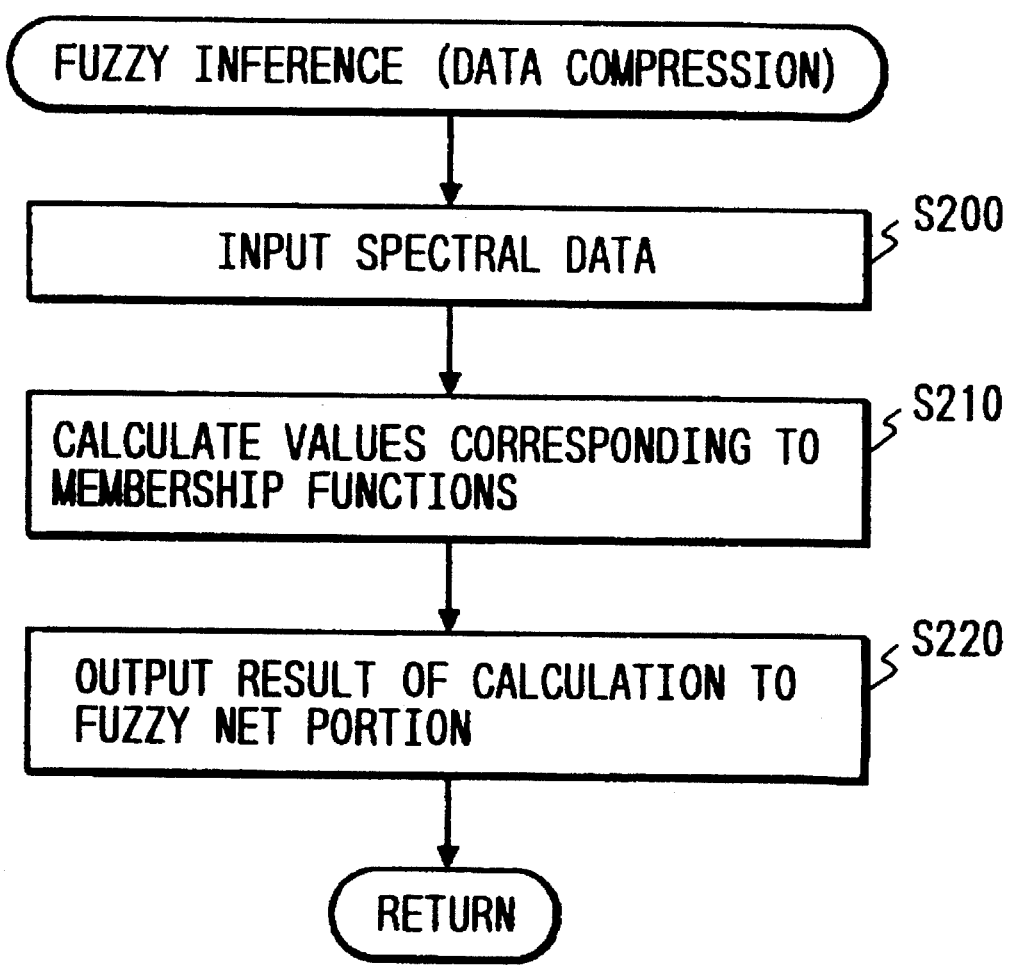
FIG. 12 is a flowchart for illustrating an operation of the input fuzzy portion.

First, the operation of each of the input fuzzy portions 207a and 207b to be performed in step S30 will be described in detail hereinbelow. FIG. 12 is a flowchart for illustrating the operation of each of the input fuzzy portions 207a and 207b. As shown in this figure, data representing the spectral intensity selected by the corresponding one of the spectral selection portion 206a and 206b, which is obtained in step S20 of a main program or routine, is inputted to the portion 204 in step S100.

Figure 10A:
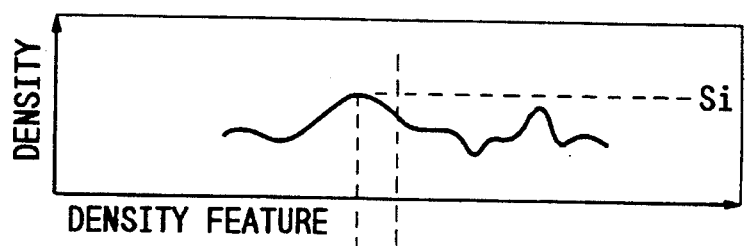
FIGS. 10(a) to 10(c) are diagrams for illustrating the process of fuzzy inference process to be performed (hereunder sometimes referred to as a fuzzy inference process) in an input fuzzy portion of FIG. 1.
Figure 10B:
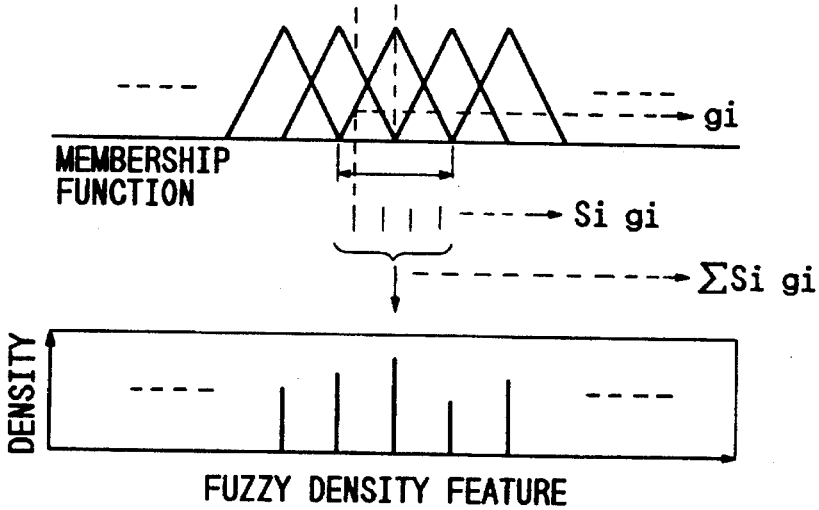

Subsequently, in step S210, each of the input fuzzy portions 207a and 207b performs a fuzzy inference process by using the triangle type membership function of FIG. 10(b) incorporated therein.

Figure 10C:
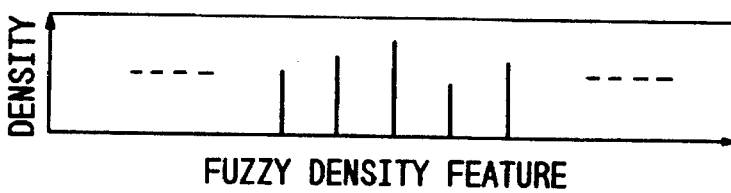

This fuzzy inference process is performed as follows. Namely, as illustrated in FIGS. 10(a) to 10(c), a coefficient gi corresponding to X-axis is first obtained by applying the triangle type membership function to a parameter Si. Then, in connection with each parameter Si, a product of the coefficient gi and the parameter Si is computed. Subsequently, a sum of the products ($\Sigma$ Si.gi) is calculated under the same triangle type membership function. Further, such a sum is similarly computed under each triangle type membership function. Thereby, the spectral intensity selected by each of the spectral selection portions 206a and 206b is converted into fuzzy density as illustrated in FIG. 10(c).

This fuzzy interference process is performed with the invention of compressing data. Namely, in general, in case of oblongly handwritten characters like a signature, especially, the number of data representing spectral intensities becomes extremely large. Such a large number of data causes reduction in processing speed in subsequent recognition process.

Furthermore, in step S220, the result of the calculation effected in step S210 is outputted to the fuzzy net portion 205.

Figure 2:
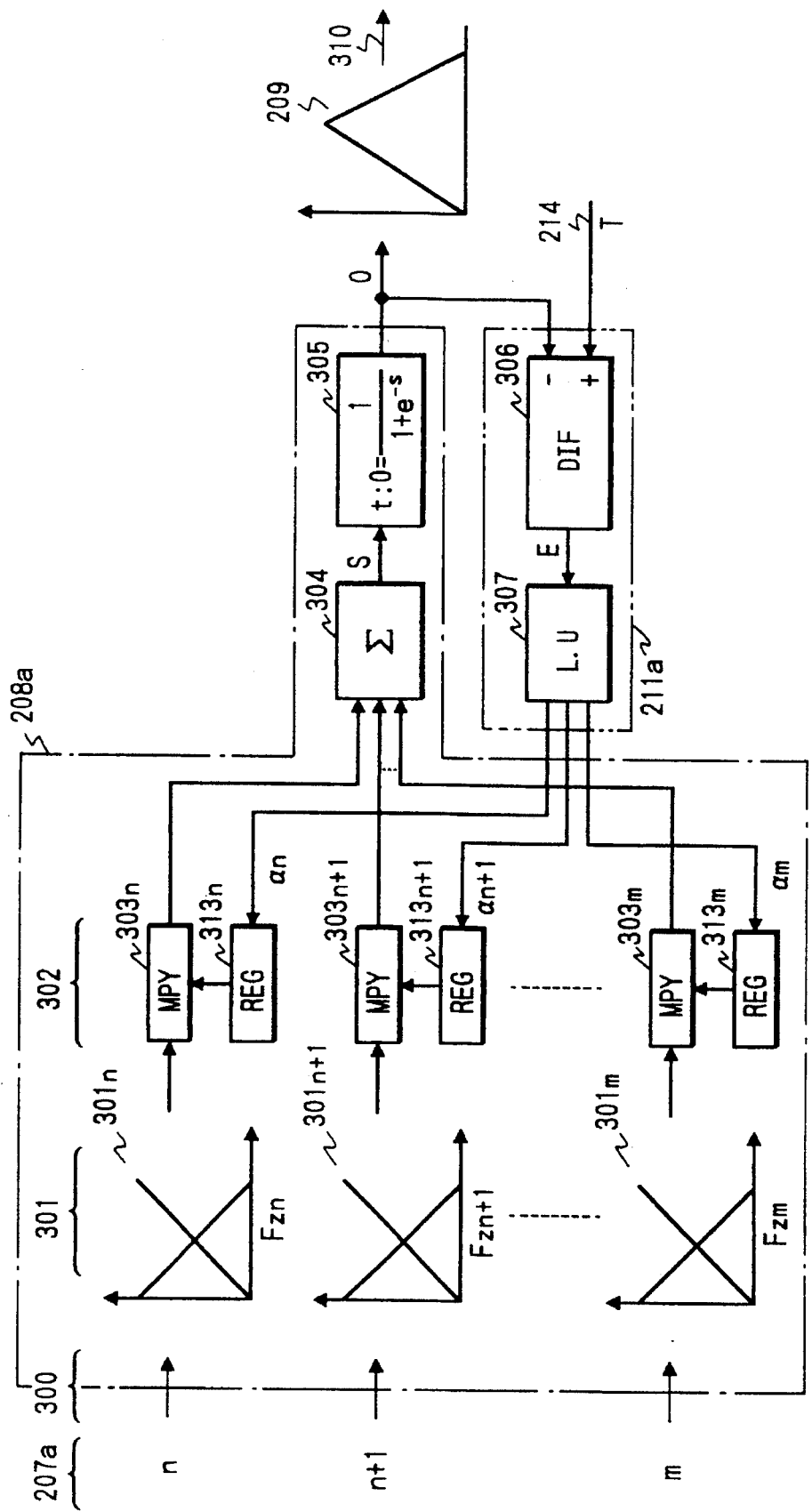
FIG. 2 is a block diagram for illustrating the detail configurations of a fuzzy net portion and a learning portion of the embodiment of FIG. 1.
Figure 13:
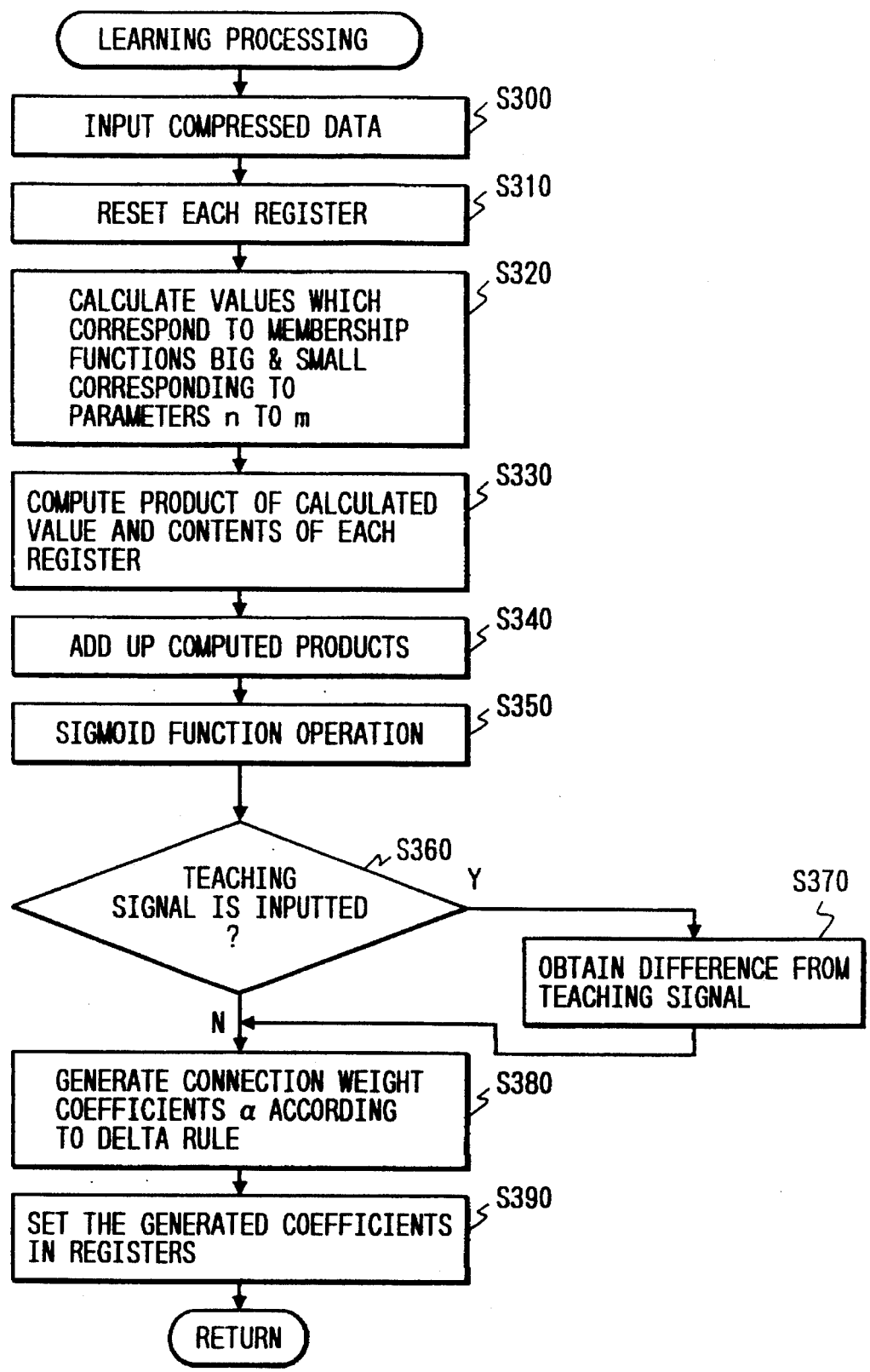
FIG. 13 is a flowchart for illustrating learning operations to be performed by the fuzzy net portion and a learning portion of FIG. 1.

Next, the operation to be performed in step S60, namely, the learning processing to be performed by the fuzzy net portions 208a and 208b and the learning portions 211a and 211b in step S60 will be described in detail hereinafter. FIG. 13 is a flowchart for illustrating the learning operation of the portions 208a, 208b, 211a and 211b. FIG. 2 is a block diagram for illustrating the detailed configuration of the portions 208a, 208b, 211a and 211b.

As is seen from FIGS. 2 and 13, the data representing the fuzzy density of the power spectra, which is compressed by the input fuzzy portions 207a and 207b, is inputted in step S300. Further, the registers 313n to 313m are initialized or reset in step S310.

Here, note that as illustrated in FIG. 2, a fuzzy portion 301 is provided in an input layer of each of the fuzzy net portions 208a and 208b. In subsequent step S320, the coefficients gi are obtained correspondingly to each of parameters n to m in the inputted fuzzy density by using both of two kinds of the membership functions (Small and Big) incorporated in the fuzzy portion 301.

Here, note that the two kinds of the membership functions Big and Small are employed in order to know which of data respectively corresponding to a large density and a small density shows personal characteristics or features of the signature between. Namely, not only a dense part having a large density but a sparse part having a small density is effective data. Therefore, the two kinds of the membership functions are employed to perform the recognition processing by effectively utilizing both of the dense part and the sparse part of the data.

Further, in step S330, the connection weight coefficients $\alpha n$ to $\alpha m$ established in the registers 313n to 313m correspondingly to the coefficients gi obtained by using both of the membership functions are accumulated in accumulation portions 303n to 303m, respectively. In next step S340, the values obtained as the result of the accumulations are added in an addition portion 304. Incidentally, this addition portion 304 employs the configuration illustrated in FIG. 4.

Subsequently, in step S350, the result (hereunder sometimes referred to as the addition value) $\Sigma$ of the addition effected in the portion 304 is substituted into the sigmoid function O which is given by the following equation (5) and has a characteristic curve illustrated in FIG. 5. Thus the corresponding certainty is computed. This sigmoid function is incorporated in an output portion 305. As is apparent from a characteristic diagram of FIG. 5, output values obtained from this sigmoid function range between 0 to 1. Namely, $$O=1/(1+\exp^{-s}) \quad (5)$$

where s designates the total sum $\Sigma$ to be inputted to the output portion; and O an output of the neural network employed therein.

Here, a signer or operator manipulates the switch 214 to transmit to the learning portions 211a and 211b his judgement made on whether or not the inputted signature is false. At that time, in case where the inputted signature is genuine, a signal representing 1 is transmitted as a teaching signal (namely, a supervised learning signal) T. Further, in case where the inputted signature is false, a signal representing 0 is transmitted as the teaching signal. Then, it is judged in step S360 whether or not the teaching signal T is inputted. If inputted, the program advances to step S370. If not inputted, the program goes forward to step S380.

Incidentally, in step S370, a difference device 306 obtains a signal difference between a signal representing the outputs O of the fuzzy net portions 208a and 208b and the teaching signal T. The obtained signal difference is inputted to the learning unit 307. Further, in step S380 in which the learning portion 307 operates, a known steepest descent method (namely, a known delta rule) is performed or implemented.

This steepest descent method is to generate the connection weight coefficients $\alpha$ outputted from the learning unit 307 in such a fashion to minimize the difference between the signal representing the outputs O of the fuzzy net portions 208a and 208b and the teaching signal T. In this embodiment, the learning operation is started by setting all of initial values of the connection weight coefficients $\alpha$ as 0. Incidentally, this learning operation is finished when a sum of squares of errors or differences between the outputs respectively corresponding to the genuine signature and the false one is equal to or less than, for instance, 0.1.

Figure 7A:
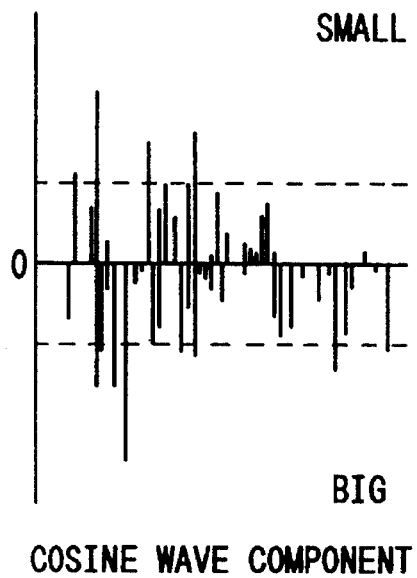
FIG. 7(a) is a graph for illustrating the distribution of connection weight coefficients corresponding to the power spectra of a sine wave component, which are stored in registers.
Figure 7B:
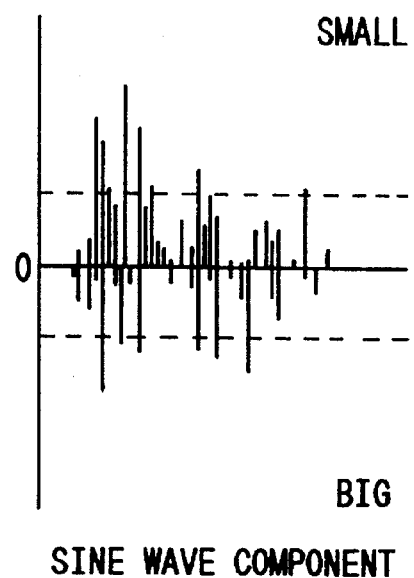
FIG. 7(b) is a graph for illustrating the distribution of connection weight coefficients corresponding to the power spectra of a cosine wave component, which are stored in registers.

Subsequently, in step S390, the connection weight coefficients $\alpha n$ to $\alpha m$ calculated by the learning unit 307 are set in the registers n to m. Thus, the distributions of the connection weight coefficients corresponding to the cosine wave component and the sine wave component as illustrated in FIGS. 7(a) and 7(b), respectively, are obtained. Then, the program returns to the main routine of FIG. 11.

Incidentally, as illustrated in FIG. 2, each of the fuzzy net portions 208a and 208b employs a two-layer perceptron consisting of an input layer 300 and an output layer (namely, an output portion 305) as a neural network, with the intention of facilitating the process of calculating the spectral intensity from the connection weight coefficients $\alpha$, which is performed by the defuzzification portions 212a and 212b (to be described later). Namely, as the result of employing the two-layer perceptron, the connection weight coefficients are set as one-dimensional ones. Thus the correlation among a large number of the connection weight coefficients can be disregarded. Consequently, the spectral intensity from the connection weight coefficients can be easily obtained.

Figure 14:
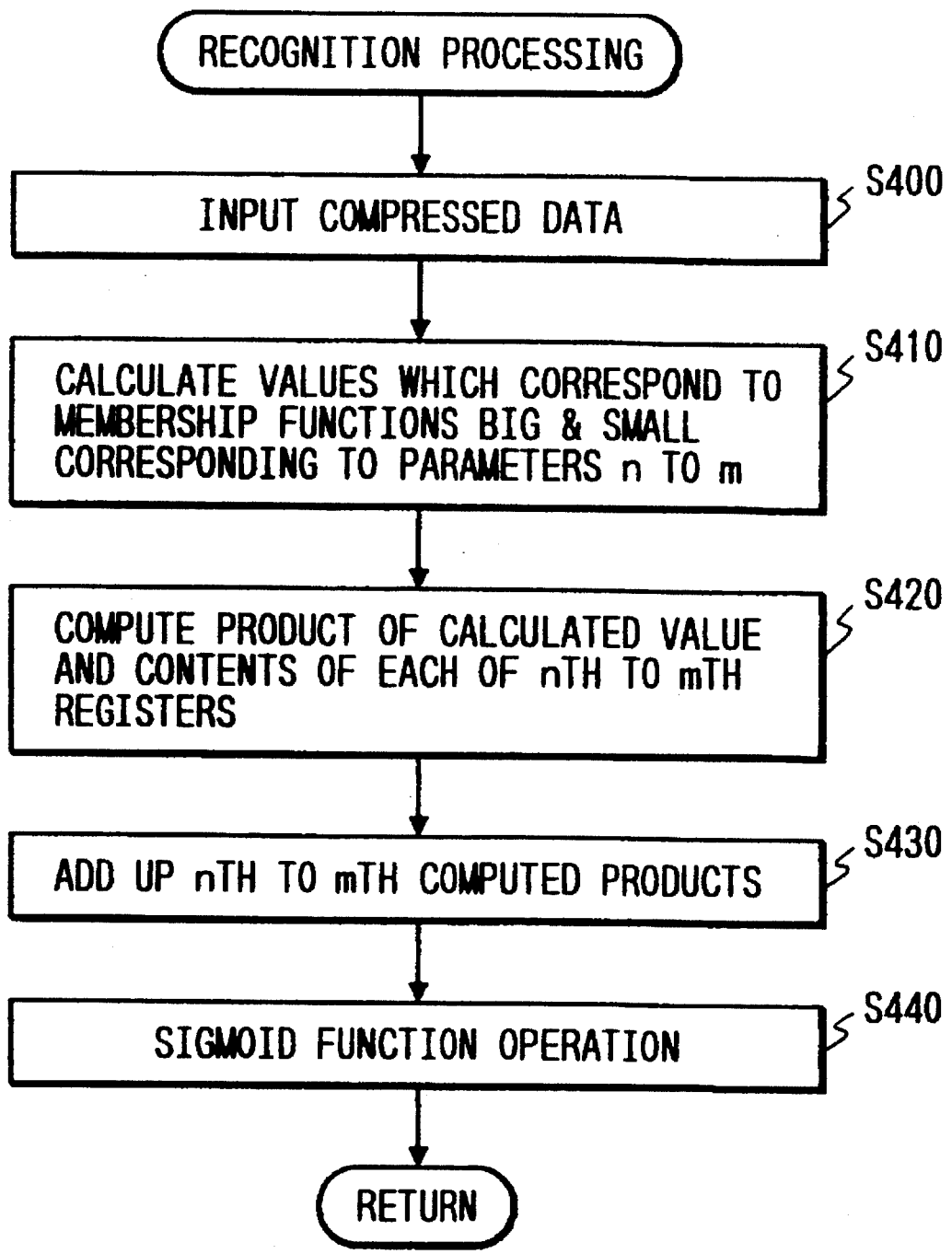
FIG. 14 is a flowchart for illustrating a recognition operation to be performed by the fuzzy net portion.

Next, the recognition operation to be performed by each of the fuzzy net portions 208a and 208b in step S100 will be described in detail hereunder. FIG. 14 is a flowchart for illustrating the recognition operation to be performed by each of the portions 208a and 208b.

As is seen from FIGS. 2 and 14, the fuzzy density compressed by the input fuzzy portion 204 is inputted in step S400.

As previously described, a fuzzy portion 301 is provided in an input layer of each of the fuzzy net portions 208a and 208b as shown in FIG. 2. In subsequent step S410, the coefficients gi are obtained correspondingly to each of parameters n to m in the inputted fuzzy density by using both of two kinds of the membership functions (Small and Big) incorporated in the fuzzy portion 301. Incidentally, the reason why the two kinds of the membership functions Big and Small are employed is that these membership functions are required to know which of data respectively corresponding to a large density and a small density shows personal characteristics or features of the signature better. Namely, since a dense part having a large density, as well as a sparse part having a small density is effective data, the two kinds of the membership functions are employed to perform the recognition processing by effectively utilizing both of the dense part and the sparse part of the data.

Further, in step S420, the connection weight coefficients $\alpha n$ to $\alpha m$ established in the registers 313n to 313m (namely, the connection weight coefficients fixed as the result of the learning control operation) correspondingly to the coefficients gi obtained by using both of the membership functions are accumulated in accumulation portions 303n to 303m, respectively, In subsequent step S330, the values obtained as the result of the accumulations are added in an addition portion 304. Incidentally, as described above, the addition portion 304 employs the configuration illustrated in FIG. 6.

Next, in step S440, the addition value Σ is substituted into the sigmoid function O which is given by the above described equation (5) and has a characteristic curve illustrated in FIG. 5. Thus the corresponding certainty is computed. Incidentally, this sigmoid function O is incorporated in the output portion 305. Then, the program returns to the main routine of FIG. 11.

Figure 15:
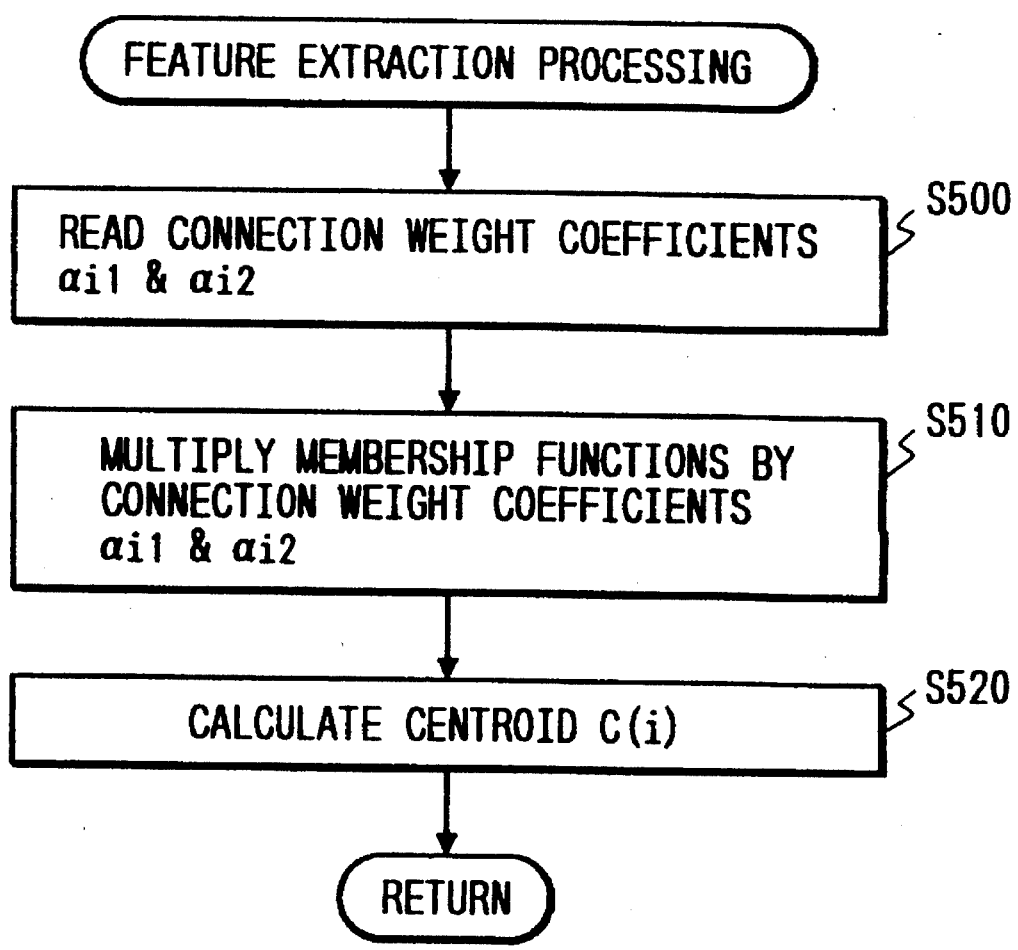

Next, the operation to be performed by each of the defuzzification portions 212a and 212b in step S130 will be described in detail hereinbelow. FIG. 15 is a flowchart for illustrating the operation of each of the defuzzification portions 212a and 212b.

As shown in this figure, the connection weight coefficients $\alpha i1$ and $\alpha i2$ corresponding to the parameter n to m of the fuzzy density (namely, corresponding to the parameter two kinds of membership functions Small and Big) are read from the registers $313n$ to $313m$ in step S500. Then, in step S510, as illustrated in FIG. 8(b), a membership function indicated by a hatched portion is generated by multiplying the connection weight coefficients $\alpha i1$ and $\alpha i2$ by the two kinds of membership functions Small and Big correspondingly to each parameter.

Figure 8B:
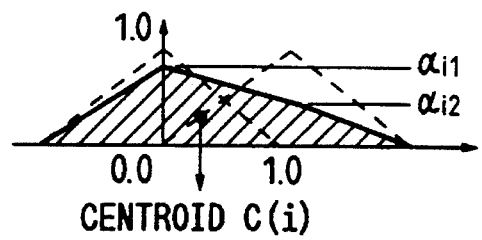
Figure 9:
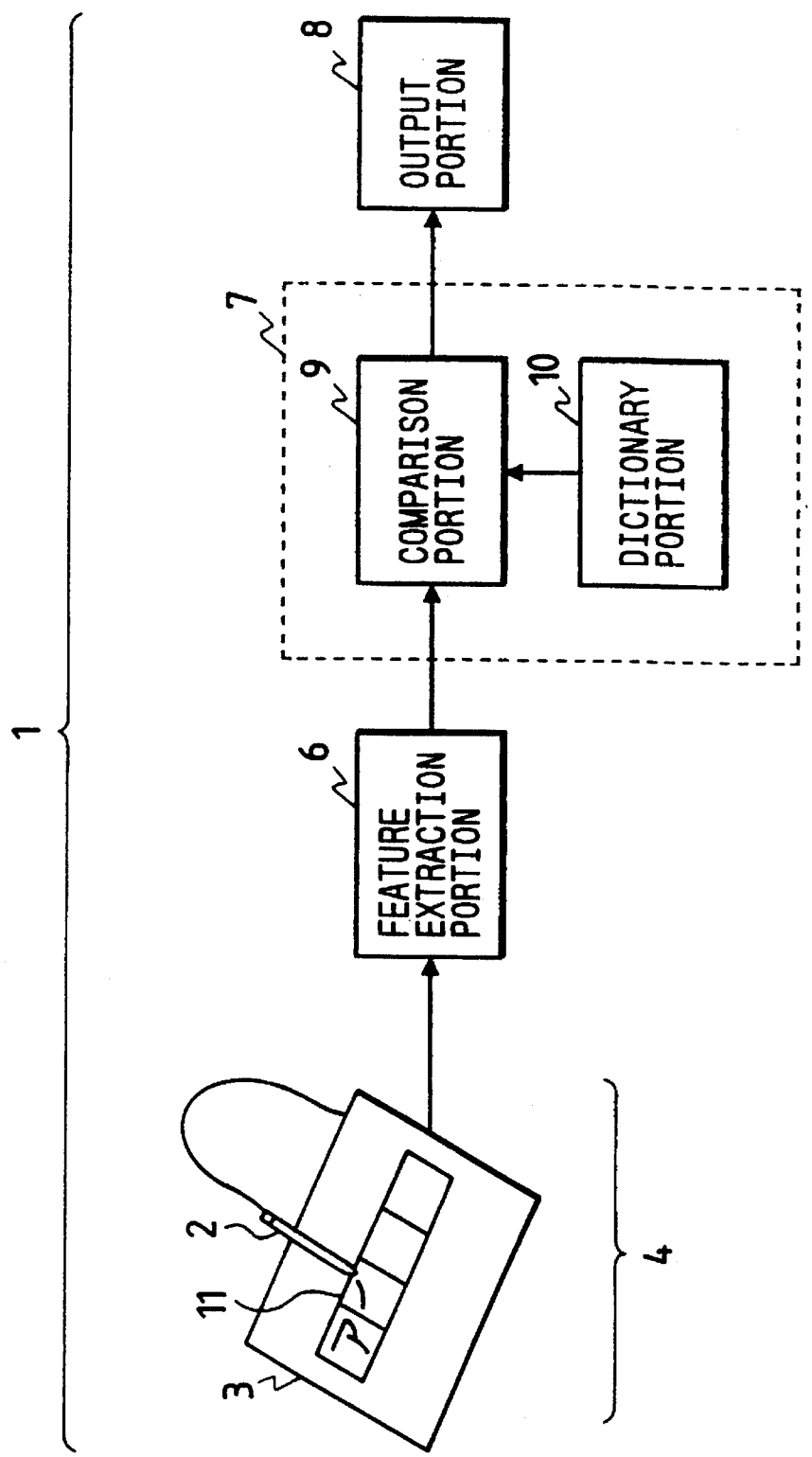
FIG. 9 is a schematic block diagram for illustrating the configuration of a conventional online-input-type character recognition device.

Subsequently, in step S520, the barycenter $c(i)$ of the membership function indicated by the hatched portion in FIG. 8(b) is calculated. Then, the program returns to the main routine of FIG. 11.

As described above, in case of this embodiment of the present invention, the number of data representing a large number of the spectral intensities can be decreased to the number of the fuzzy rules employed in the input fuzzy portions 207a and 207b by performing the fuzzy inference on the spectral intensity of the signature data representing the handwritten signature inputted online. Thus, the compression of the data representing the stroke densities can be achieved. Moreover, data absorbing the change thereof due to the distortion caused in writing the signature can be obtained by the fuzzy net portions 208a and 208b.

Furthermore, the recognition processing is performed on the obtained data by utilizing the learning function of the fuzzy net. Thereby, good recognition precision can be obtained.

Further, for the purpose of facilitating the calculation of the spectra intensities from the connection weight coefficients α when a reproduction line is displayed as the inputted handwritten signature, the two-layer perceptron is employed as each of the fuzzy net portions 208a and 208b. As the result of employing the two-layer perceptron, the connection weight coefficients are set as one-dimensional ones. Thus, the spectral intensities can be easily obtained. Further, the result of the recognition with higher precision can be obtained by performing the fuzzy inference on the certainty of the signature, which is outputted by each of the fuzzy net portions 208a and 208b.

Next, another embodiment (hereunder sometimes referred to as a second embodiment) of the present invention will be described hereinbelow.

Namely, in case of the first embodiment, it is assumed that the handwritten signature is written in a single stroke, with the intention of making the end of the signature clear. However, in actual cases, the pen 202 becomes sometimes out of contact with the surface of the tablet 203. In such cases, the pen touch information Z is monitored. If a period of time, in which a signal indicating the pen touch information is off, is short (namely, is shorter than a predetermined length), it can be judged that the signature is not completed. In contrast, if such a period of time is long, it can be judged that the signature is completed. Incidentally, if such a period of time is short, information indicating the beginning of such a short period of time, in which the signal indicating the pen touch information is off, can be used as information indicating the individuality or personal characteristic of the signer.

Further, the handwriting input portion 204 if not necessarily incorporated in the signature recognition device. Namely, the handwriting input portion 204 may be used in an apparatus for reading data representing a handwritten signature by performing an online real time processing by using, for example, a telewriting device in a distant place.

Further, in case of the aforesaid embodiments of the present invention, the two kinds of the membership functions Small and Big are employed in the fuzzy net portion 205. However, the larger the number of kinds of employed membership functions (thus, the number of employed fuzzy rules) becomes, the higher the capability of recognizing of judging a signature becomes.

Moreover, the membership functions are not limited to those of the triangle type. However, in case where the neural network comprised of a two-layer perceptron as of the above described embodiment of the present invention is employed, it is necessary for ensuring the learning function to make the fuzzy portion of the input layer of the neural network function as linearization means.

While preferred embodiments of the present invention have been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. An information medium recognition device for recognizing a handwritten information medium input by performing an online input operation, the information medium recognition device comprising:

input means for receiving the information medium online and for outputting an information signal representing the received information medium;

detection means for detecting a spectral intensity of a cosine wave component of the information medium and a spectral intensity of a sine wave processing on the information signal received from the input means;

conversion means for receiving values of the spectral intensities of the cosine and sine wave components of the information medium, which are detected by the detection means, converting the value of the spectral intensity of the cosine wave component into one of a plurality of first fuzzy sets based on first membership functions by performing a fuzzy inference process thereon, and converting the value of the spectral intensity of the sine wave component into one of a plurality of second fuzzy sets based on second membership functions by performing a fuzzy inference process thereon, wherein the first membership functions are high-resolution type membership functions and are different from the second membership functions and the number of the first fuzzy sets is larger than the number of the second fuzzy sets; and judgment means for judging whether or not the information medium is genuine from the combination of the first and second fuzzy sets into which values of the spectral intensities of the cosine and sine wave components are, respectively, converted by the conversion means.

2. An information medium recognition device according to claim 1, wherein at least three first fuzzy sets are established based on the first membership functions is at least three and at least three second fuzzy sets are established based on the second membership function.

3. An information medium recognition device according to claim 1, wherein the judgment means includes a genuineness judgement table having cells that correspond to a combination of one of the first fuzzy sets and one of the second fuzzy sets and hold data indicating whether the information medium is genuine or false and wherein it is judged whether or not the information medium is genuine based on the data held in a cell corresponding to a combination of one of the first fuzzy sets and one of the second fuzzy sets, respectively, obtained by the conversion means as a result of converting the values of the spectral intensities of the sine and cosine wave components.

4. An information medium recognition device according to claim 3, wherein a balance between a number of cells, which indicate that the information medium is genuine, and cells, which indicate that the information medium is false, in the genuineness judgment table is changed according a purpose for which the information medium recognition device is used.

5. An information medium recognition device according to claim 1, wherein the input means comprises writing means and information-medium recording means electromagnetically coupled with the writing means in which the information medium is recorded by the writing means, and wherein the information signal output by the input means represents locus information indicative of a position of the writing means and contact information indicative of whether the writing means is in contact with the information-medium recording means, which are obtained by utilizing electromagnetic coupling between the writing means and the information-medium recording means.

6. An information medium recognition device according to claim 5, wherein the information signal output by the input means further represents pressure information indicative of a pressure applied by the writing means on the information-medium recording means.

7. An information medium recognition device according to claim 1, wherein the detection means comprises:

processing means for performing the P-type Fourier transform processing on the information signal received from the input means to obtain the spectral intensity of the information medium; and elimination means for eliminating high-frequency components of the spectral intensity of the information medium, which is obtained by the processing means.

8. An information medium recognition device according to claim 1, wherein the information medium is a signature.

* * * * *